(12) United States Patent
Sagemueller et al.

(10) Patent No.: US 11,480,419 B2
(45) Date of Patent: Oct. 25, 2022

(54) ROTARY TABLE MODULE AND COORDINATE MEASURING MACHINE WITH ROTARY TABLE MODULE AND METHOD FOR OPERATING THE SAME

(71) Applicant: Carl Zeiss Industrielle Messtechnik GmbH, Oberkochen (DE)

(72) Inventors: Rainer Sagemueller, Aalen (DE); Johannes Geiger, Nattheim (DE); Sabrina Rau, Koenigsbronn (DE); Peter Uhl, Unterschneidheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 50 days.

(21) Appl. No.: 17/191,592

(22) Filed: Mar. 3, 2021

(65) Prior Publication Data

US 2021/0278191 A1 Sep. 9, 2021

(30) Foreign Application Priority Data

Mar. 4, 2020 (DE) ..................... 10 2020 105 871.3

(51) Int. Cl.
*G01B 5/008* (2006.01)
*G01B 5/00* (2006.01)

(52) U.S. Cl.
CPC ........... *G01B 5/0004* (2013.01); *G01B 5/008* (2013.01)

(58) Field of Classification Search
CPC .............................. G01B 5/0004; G01B 5/008
(Continued)

(56) References Cited

U.S. PATENT DOCUMENTS 5,396,712 A 3/1995 Herzog
5,646,732 A * 7/1997 Gerlach ................. G01B 11/02
356/616
(Continued)

FOREIGN PATENT DOCUMENTS

DE 4238139 C2 10/2002
DE 102016211278 A1 12/2016
(Continued)

OTHER PUBLICATIONS

Office Action issued in German Patent Application No. DE 10 2020 105 871.3, dated Oct. 28, 2020 (from which this application claims priority) and English language machine translation thereof.
(Continued)

*Primary Examiner* — George B Bennett
(74) *Attorney, Agent, or Firm* — Falk Ewers; Ewers IP Law PLLC

(57) ABSTRACT

A coordinate measuring machine and a method for operating a coordinate measuring machine, and a rotary table module for a coordinate measuring machine with a rotary table for receiving a workpiece and a rotary table block are provided. The rotary table is supported on a rotary table side rotatably about a rotary table axis. The rotary table block has, opposite the rotary table side of the rotary table block, a bottom side with which the rotary table module can be supported on a measurement table of the coordinate measuring machine. The rotary table block has a further supporting side with which the rotary table block is supportable on the measurement table of the coordinate measuring machine and which differs from the bottom side in its alignment. The rotary table module includes a pose capturing device for the determination of whether the rotary table block is supported on the bottom side.

25 Claims, 5 Drawing Sheets

(58) Field of Classification Search
USPC .................................................. 33/502, 503
See application file for complete search history.

(56) References Cited

U.S. PATENT DOCUMENTS

| | | | |
|---|---|---|---|
| 9,383,198 B2 * | 7/2016 | Sagemueller | ........ B23Q 17/225 |
| 9,683,827 B2 | 6/2017 | Wimmer | |
| 10,670,383 B2 * | 6/2020 | Engel | ................... G01B 21/042 |
| 10,801,825 B2 | 10/2020 | Sagemüller | |
| 2015/0345937 A1 * | 12/2015 | Seitz | ....................... G01B 11/26 |
| | | | 250/231.13 |
| 2018/0094923 A1 * | 4/2018 | Sagemueller | ........ G01B 5/0004 |
| 2021/0010791 A1 * | 1/2021 | Puntigam | ............. G01B 5/0004 |
| 2021/0107215 A1 * | 4/2021 | Bauza | ................... B29C 64/227 |

FOREIGN PATENT DOCUMENTS

| | | |
|---|---|---|
| DE | 102015219141 A1 | 4/2017 |
| WO | 02090879 A2 | 11/2002 |
| WO | 2013164344 A1 | 11/2013 |

OTHER PUBLICATIONS

GPS—Acceptance and reverification test for coordinate measuring machines (CMM), DIN EN ISO 10360-3, European Standard EN ISO 10360-3 (2000).

* cited by examiner

ROTARY TABLE MODULE AND COORDINATE MEASURING MACHINE WITH ROTARY TABLE MODULE AND METHOD FOR OPERATING THE SAME

CROSS REFERENCE TO RELATED APPLICATIONS

This application claims priority to German patent application DE 10 2020 105 871.3, filed Mar. 4, 2020, the entire content of which is incorporated herein by reference.

TECHNICAL FIELD

The present disclosure relates to a coordinate measuring machine, to a method for operating a coordinate measuring machine, and to a rotary table module for a coordinate measuring machine having a rotary table for receiving a workpiece and a rotary table block, in which the rotary table is supported on a rotary table side so as to be rotatable about a rotary table axis.

BACKGROUND

Coordinate measuring machines are used to measure components and have a measurement region in which a workpiece or component to be measured can be supported for measurement. In order to allow rotation of the workpiece for the measurement, the workpiece can be supported on a rotary table. The rotary table can be rotatably held in a rotary table module, which includes the rotary table as a rotor and a rotary table block as a stator. The rotary table module can be detachably arranged in the measurement region of the coordinate measuring machine.

Coordinate measuring machines usually have a probe head that is movable in three spatial directions and has a probe element for probing the component, so that by contacting the workpiece or component it can be measured. The probe head of such a coordinate measuring machine can be moved along three independent spatial directions X, Y, and Z in a way corresponding to a Cartesian XYZ coordinate system, in order thus to be able to reach any desired location within a measurement space. Alternatively, part of the movement can be performed by a measurement table of the coordinate measuring machine.

If a rotary table is provided on the coordinate measuring machine to support the workpiece or component, the component to be measured can be rotated into various positions in addition to moving the probe head. For this purpose, the workpiece is arranged on the rotary table, wherein the rotary table and thus the workpiece are rotatable about a rotary table axis. With rotatable supporting of the workpiece, however, the measurement values that are captured with respect to the Cartesian XYZ coordinate system of the coordinate measuring machine must be converted into a coordinate system of the workpiece or of the rotary table. It is correspondingly necessary for an exact measurement of the component that the position and orientation of the rotary table axis or of a rotary table coordinate system is known precisely in relation to the coordinate system of the coordinate measuring machine. The calibration of the rotary table axis or of the rotary table coordinate system, i.e., the determination of the position and orientation of the rotary table axis in relation to the coordinate system of the coordinate measuring machine, is correspondingly already provided in DIN EN ISO 10360-3 for coordinate measuring machines with additional rotary table axes.

Various methods for determining the position and orientation of the rotary table axis or of the rotary table coordinate system are available for this purpose. Such methods are described, for example, in WO 02/090879 A2 and WO 2013/164344 A1. Document DE 10 2015 219 141 A1 also describes a method for measuring the rotary table that is used in a numerically controlled machine tool.

In coordinate measuring machines with rotary tables, a distinction is furthermore made between single-stage and two-stage or multi-stage rotary tables. Single-stage rotary tables have a rigid rotary table axis of the rotary table which, apart from the rotation about its own axis, does not allow any further rotation or movement relative to the rotary table block in which the rotary table is held. Two-stage rotary tables, on the other hand, allow the rotary table axis of the rotary table to be pivoted about a further rotary table axis, which extends transversely to the rotary table axis of the rotary table. Rotary tables which, in addition to a first rotary table axis, have a second rotary table axis arranged perpendicular to the first rotary table axis so as to be able to pivot or tilt the rotary table are already known from the German laid-open specification DE 10 2015 219 141 A1 and the German patent DE 42 38 139 C2.

When using a single-stage rotary table arranged in a rotary table block of a rotary table module, it is also possible to change the alignment or orientation of the rotary table by tilting the entire rotary table module so that, for example, the rotary table axis is not aligned vertically, as usual, but horizontally. In this case, it is possible, particularly with very long workpieces to be measured, such as crankshafts or camshafts, or when measuring gearwheels, to allow better access to the measurement system or to the probe or probe head.

However, if the rotary table is operated with the rotary table axis aligned horizontally, there is an increased risk of an operator entering the gap between the rotary table and a base of the measurement region of the coordinate measuring machine on which the rotary table module is supported, such as a measurement table, increasing the risk of injury. Due to the rotary movement of the rotary table and the formation of a gap between the rotary table and the base of the measurement region of the coordinate measuring machine, parts of the operator's body, such as a hand, may in particular be pulled by the rotary table into the gap and crushed there.

SUMMARY

Accordingly, it is an object of the present disclosure to provide a single-stage, mobile rotary table module for a coordinate measuring machine and a coordinate measuring machine having such a rotary table module, and also a method for operating a corresponding coordinate measuring machine in which the risk of injury to an operator is minimized, i.e., safe operation can be ensured. At the same time, however, a corresponding coordinate measuring machine or rotary table module should be of simple construction and easily operable and should deliver reliably accurate measurement results.

This object is achieved by a rotary table module, a coordinate measuring machine, and a method for operating a coordinate measuring machine as described herein.

For single-stage rotary table modules of the type mentioned in the introductory part, the disclosure proposes providing at least one pose capturing device at the rotary table module for determining the orientation or alignment of the rotary table module.

Orientation or alignment of the rotary table module is understood to mean, in particular, the orientation or alignment of the rotary table axis of the rotary table arranged in the rotary table module, wherein the rotary table is rotatable only about its rotary table axis, but, other than the rotation of the rotary table, no further movement of the rotary table with respect to the rotary table block in which the rotary table is held in the rotary table module is possible, meaning it is a single-stage rotary table module. The orientation or alignment of the rotary table axis of the rotary table of the rotary table module can be defined, for example, by a vector representation. The rotary table axis is understood here to mean the axis of rotation of the rotary table, that is to say the axis about which the rotary table rotates. However, the rotary table axis should not be understood as a component in the form of a spindle or a shaft, even though the rotary table can nonetheless have such a component.

To ensure safe operation of the rotary table module, it may in particular be sufficient to only determine, by way of the pose capturing device, whether the rotary table module and thus the rotary table axis of the rotary table is arranged in a specific alignment or orientation, in particular in an orientation that corresponds to the usual arrangement of the rotary table module, in which the rotary table axis is vertically aligned.

Vertical is understood here to mean the direction of gravity if the rotary table module is arranged in the operating state.

The rotary table block in which the rotary table with the rotary table axis is supported has, opposite the rotary table side of the rotary table block on which the rotary table is arranged, a bottom side on which the rotary table module can be supported in a measurement region and/or on a measurement table of the coordinate measuring machine. Accordingly, the pose capturing device of the rotary table module is embodied in particular such that it can be determined whether the rotary table block of the rotary table module is supported on the bottom side and thus typically the rotary table axis is arranged parallel to the vertical, since the rotary table axis of the rotary table is in particular arranged transversely, typically perpendicular, to the bottom side or parallel to the normal of the bottom side, with the result that the rotary table axis is aligned vertically during operation, if the rotary table block is supported on the bottom side.

If a deviation of the rotary table axis from the vertical is captured, the rotation of the rotary table can be restricted for safe operation of the rotary table.

The rotary table module can furthermore be embodied such that it can be supported in various orientations and alignments in the measurement region of the coordinate measuring machine. In addition to the bottom side, at least one further supporting side that differs from the bottom side in its alignment and allows the rotary table block to be supported in the measurement region or on a measurement table of the coordinate measuring machine can be provided for this purpose at the rotary table block.

The one or more supporting sides can be embodied such that the rotary table axis of the rotary table is arranged at an angle less than 90°, in particular parallel to the supporting side, or at an angle larger than 0°, in particular at an angle of 90° to the normal of the supporting side. The rotary table module can thus be arranged in the coordinate measuring machine in different specified orientations.

The pose capturing device for capturing the orientation of the rotary table module can in particular be embodied in such a way that it can be determined on which side of the rotary table block it is supported and thus which alignment the rotary table axis of the rotary table has. Targeted operation of the rotary table can accordingly be set on the basis of this information.

The rotary table module can have a drive apparatus for driving the rotary table and a rotary table controller, which can be embodied such that the drive for the rotation of the rotary table is changed and, in particular, restricted if the pose capturing device determines that the rotary table block is not supported on the bottom side completely or by its full area and thus in particular the rotary table axis is tilted out of the vertical alignment. In this context, not completely is thus understood to mean that the rotary table module is not arranged in the intended manner in the measurement region of the coordinate measuring machine, that is to say, for example, it is tilted. Furthermore, it is also possible to determine whether there is a deviation from a specified orientation of the rotary table module, i.e., whether the arrangement on a supporting side of the rotary table block is not error-free, so that in this case, similar to the incorrect arrangement on the bottom side, the operation of the rotary table module can be restricted.

The change or restriction of the drive for the rotary movement of the rotary table can be implemented by various measures, and these may include in particular restricting the direction of rotation of the rotary table, restricting the power of the drive apparatus, restricting the rotational speed of the rotary table, restricting the torque of the drive, restricting the speed of rotation of the rotary table, restricting the acceleration of rotation, restricting the operating current of a motor of the drive apparatus of the rotary table, restricting the kinetic energy of the rotary table with the workpiece, restricting the rotation angle range, and/or stopping the drive.

In particular it is possible, if the pose capturing device(s) determine(s) not only that the orientation or alignment of the rotary table module does not correspond to a specified alignment or orientation, but rather that the alignment or orientation of the rotary table module can be determined, that the rotary table module and a corresponding rotary table controller are embodied such that specific parameters for the drive are specified for the rotation of the rotary table. In particular, parameters, in particular closed-loop and/or filter parameters of a closed-loop control section for the closed-loop control of the rotary table drive can also be set in dependence on the orientation of the rotary table module. The specified parameters can include the direction of rotation of the rotary table, the power of the drive apparatus, the rotational speed of the rotary table, the torque of the drive, the speed of rotation of the rotary table, the acceleration of rotation, and the operating current of a motor of the drive apparatus of the rotary table.

The pose capturing device can in particular include an acceleration sensor, an inclination sensor, an orientation sensor, a ball sensor, a capacitive sensor, a brightness sensor, a switch, a mercury switch, a push button, a contact switch, a rotary switch, a magnetic switch, a reed switch, and/or a light barrier. With appropriate sensors, such as acceleration sensors, inclination sensors, orientation sensors, etc., the alignment or the orientation of the rotary table module can be determined directly. In the case of a switch, the orientation or alignment of the rotary table module can be confirmed by an operator or can be determined automatically if the rotary table module is supported on a supporting side by way of a contact switch provided there.

In order to ensure the safety of the operator, the rotary table module can have at least two pose capturing devices that operate independently of one another and with the aid of which the alignment or orientation of the rotary table module is determined. Depending on the information that is made available by the pose capturing device, for example the rotary table controller or a control device of a coordinate measuring machine, corresponding restrictions on the operation or enabling of the operation can be initiated. For example, it is possible to enable the unrestricted operation of the rotary table module only if a vertical orientation of the rotary table axis of the rotary table module is determined by at least two pose capturing devices. If a deviation of the rotary table axis from the vertical orientation is determined by at least one pose capturing device, the operation of the rotary table module can be restricted or stopped entirely. This is also possible if different information about the orientation of the rotary table module is made available by a plurality of pose capturing devices. In particular, provision can be made that unrestricted operation of the rotary table module is possible only if all pose capturing devices indicate the vertical orientation of the rotary table module.

A corresponding rotary table module can be detachably arranged in a coordinate measuring machine that has at least one measurement device for measuring a workpiece.

The coordinate measuring machine can furthermore have a control device interacting with a rotary table controller of the rotary table module, for controlling components of the coordinate measuring machine. For example, the rotary table controller of the rotary table module can restrict the operation of the rotary table module on account of the pose capturing device and pass this information on to the control device of the coordinate measuring machine. It is also possible that the rotary table controller of the rotary table module is at least partially integrated in the control device of the coordinate measuring machine, that is to say that the rotary table module is also controlled by the control device of the coordinate measuring machine.

Accordingly, such a coordinate measuring machine having a rotary table module can include at least one arrangement capturing device for capturing the arrangement of the rotary table module, wherein the arrangement capturing device can have at least one, typically two, orientation capturing devices that operate independently of one another, each of which can detect the orientation of the rotary table module if the rotary table module is arranged in the measurement region of the measurement device.

The orientation capturing devices of the coordinate measuring machine can be formed entirely or partially by the pose capturing devices of the rotary table module. Moreover, the orientation capturing devices can be implemented by user input interfaces of the coordinate measuring machine and/or a device for determining a rotary table coordinate system. Moreover, further sensors, such as light sensors, light barriers, contact switches and the like, can be used to implement an orientation capturing device.

The device for determining a rotary table coordinate system can be embodied such that the orientation of the rotary table axis is determined by determining the position and orientation of the rotary table coordinate system, what is known as calibration of the rotary table coordinate system, with the result that the information about the orientation of the rotary table module is available thereby. The design or the type of the rotary table module that is used can be taken into account by storing the associated information in a memory that is readable automatically by the rotary table controller or the controller of the coordinate measuring machine, such as an ID chip, or by using a fixedly specified type of the rotary table module.

The operation of a corresponding coordinate measuring machine with at least one measurement device and a rotary table module for receiving the workpiece thus includes arranging the rotary table module in the measurement region of the measurement device or on a measurement table of the coordinate measuring machine and determining the orientation of the rotary table module by way of at least one, typically two, orientation capturing devices that operate independently of one another.

The rotary table module can have a drive apparatus for driving the rotary table, wherein the drive for the rotation of the rotary table is restricted if the rotary table module is arranged in an alignment in which the rotary table axis of the rotary table is arranged obliquely to the vertical, in particular in a horizontal alignment. Provision may be made in particular that the operation of the rotary table and thus driving of the rotary table to perform a rotary movement about the rotary table axis is possible only if the rotary table axis is positioned in one or more specific alignments or orientations. This may not only ensure safe operation of the rotary table module in the case of an oblique alignment of the rotary table axis with respect to the vertical, but it is also possible to capture unintentional misalignments of the rotary table module and to adapt the operation of the rotary table module or to stop operation.

To reliably determine the orientation of the rotary table module, a comparison of independently captured orientations can be carried out by the various pose capturing devices and/or orientation capturing devices. Depending on the required certainty about the correctness of the information obtained, the information from one or more independently operating pose capturing devices and/or orientation capturing devices may be required. Tilting of the rotary table axis of the rotary table at an angle to the vertical can already be determined if this is determined by at least one orientation capturing device or pose capturing device. This is because, as a precaution, necessary safety measures, such as restricting the operation of the rotary table, are taken as soon as there is an indication of a tilted rotary table axis. By contrast, the determination of the orientation of the rotary table module with supporting of the rotary table module on a specific supporting side can only be regarded as having been determined if this has been determined by at least two independent orientation capturing devices and/or pose capturing devices. By contrast, the driving of the rotary table to perform a rotary movement about the rotary table axis can be omitted if the orientations of the rotary table module determined by a plurality of orientation capturing devices and/or pose capturing devices differ.

The orientation of the rotary table module can be determined in particular by determining the position and alignment of a rotary table coordinate system associated with the rotary table, wherein in particular the orientation of the rotary table module thus captured is compared and/or combined with the captured orientations of the rotary table module using at least one other orientation capturing device and/or pose capturing device. For example, before determining the position and alignment of the rotary table coordinate system, for which operation of the rotary table is already required, it is possible to determine the orientation of the rotary table module by an input by the user and the capturing of the orientation by an orientation sensor and to verify this orientation of the rotary table module through the calibration of the rotary table coordinate system with the result that safe operation of the rotary table module is possible through redundant information. As long as there is no redundant information about the orientation of the rotary table module or the rotary table axis, the rotary table module can begin to operate with restricted parameters.

BRIEF DESCRIPTION OF THE DRAWINGS

The disclosure will now be described with reference to the drawings wherein.

DESCRIPTION OF EXEMPLARY EMBODIMENTS

Further advantages, characteristics and features of the present disclosure will become apparent from the following detailed description of the exemplary embodiments. However, the disclosure is not limited to these exemplary embodiments.

In the present description, the terms vertical and horizontal are understood to mean that the vertical direction indicates the direction of the acceleration due to gravity and the horizontal direction indicates the direction that is transverse thereto. If the terms vertical and horizontal are used in relation to a component, such as the rotary table module, they relate to the arrangement if used as intended. The specification of the vertical alignment of the rotary table module thus indicates that the rotary table module is aligned vertically with the rotary table axis of the rotary table during operation, that is, in the direction of the acceleration due to gravity. Accordingly, the specification of the horizontal alignment of a component, such as of the rotary table module, means that the component is aligned transversely to the acceleration due to gravity, for example the rotary table module with the rotary table axis transversely to the direction of acceleration due to gravity. Oblique alignments or orientations relate accordingly to arrangements in which the component, for example the rotary table module with the rotary table axis, is aligned at an angle to the vertical or horizontal direction.

Figure 1:
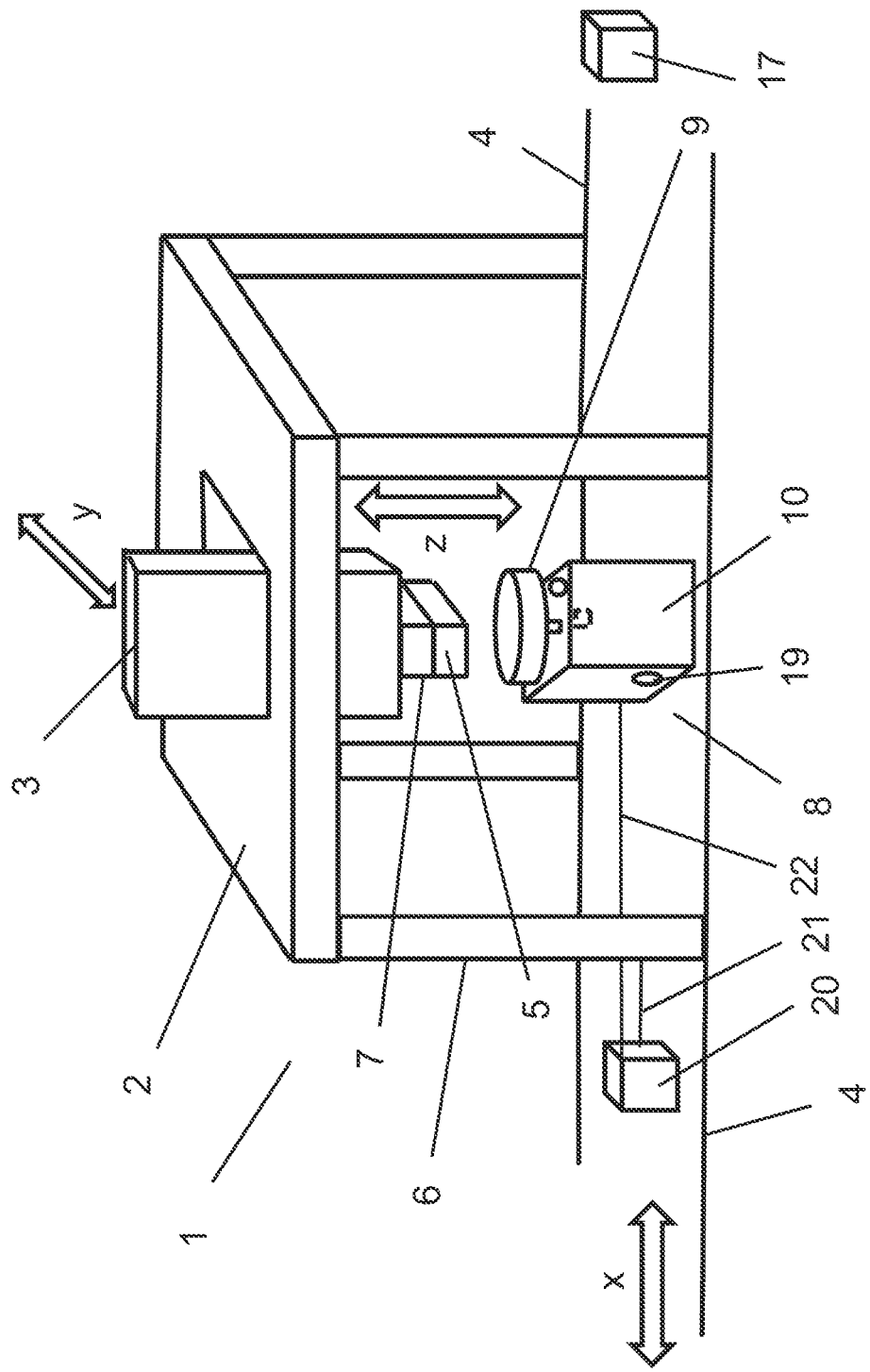
FIG. 1 shows a coordinate measuring machine having a rotary table module with a vertical alignment of the rotary table axis of the rotary table.

FIG. 1 shows a coordinate measuring machine 1 according to the present disclosure. The coordinate measuring machine 1 includes a carrier structure with a movable gantry carrier 2, movably received in which there is in turn a carriage 3, on which a measurement system 5 is arranged in a vertically movable mount 7. The measurement system 5 can have at least one contactless sensor, e.g., an optical, capacitive or inductive sensor, and/or at least one tactile sensor, by way of which an object to be measured (not illustrated) can be captured. In the case of an optical sensor, this can take place contactless, whereas with a tactile sensor the dimensions and/or shape of the object to be measured is determined by corresponding contact with the object to be measured.

The gantry carrier 2 is movable along a rail arrangement having rails 4, wherein the longitudinal extent of the rails 4 corresponds to the X-direction, so that the measurement system 5 can be adjusted in the X-direction by moving the gantry carrier 2 along the rails 4. The carriage 3 can be moved in the gantry carrier 2 in a direction transverse to the X-direction, to be specific, in the Y-direction, wherein a movement of the measurement system 5 with the mount 7, which is vertically movable in the carriage 3, perpendicular to the plane defined by the X- and Y-directions is additionally possible, with the result that the measurement system 5 can be moved along the coordinate axes X, Y, and Z to any desired point in the measurement space defined by the coordinate measuring machine 1.

The workpiece to be measured can be supported on a rotary table 9, which is rotatably arranged in a rotary table module 8 in a rotary table block 10, which can be arranged in the measurement space of the coordinate measuring machine 1. For example, the rotary table module 8 can be arranged on a measurement table (not shown) of the coordinate measuring machine 1. The rotary table module 8 is mobile and can be detachably arranged in various positions of the measurement space of the coordinate measuring machine 1. By rotating the rotary table 9 about a rotary table axis, the workpiece supported on the rotary table 9 can be brought into different rotational positions. Appropriate means for holding workpieces, such as clamping elements and the like, can be provided on the top side of the rotary table 8.

Figure 2:
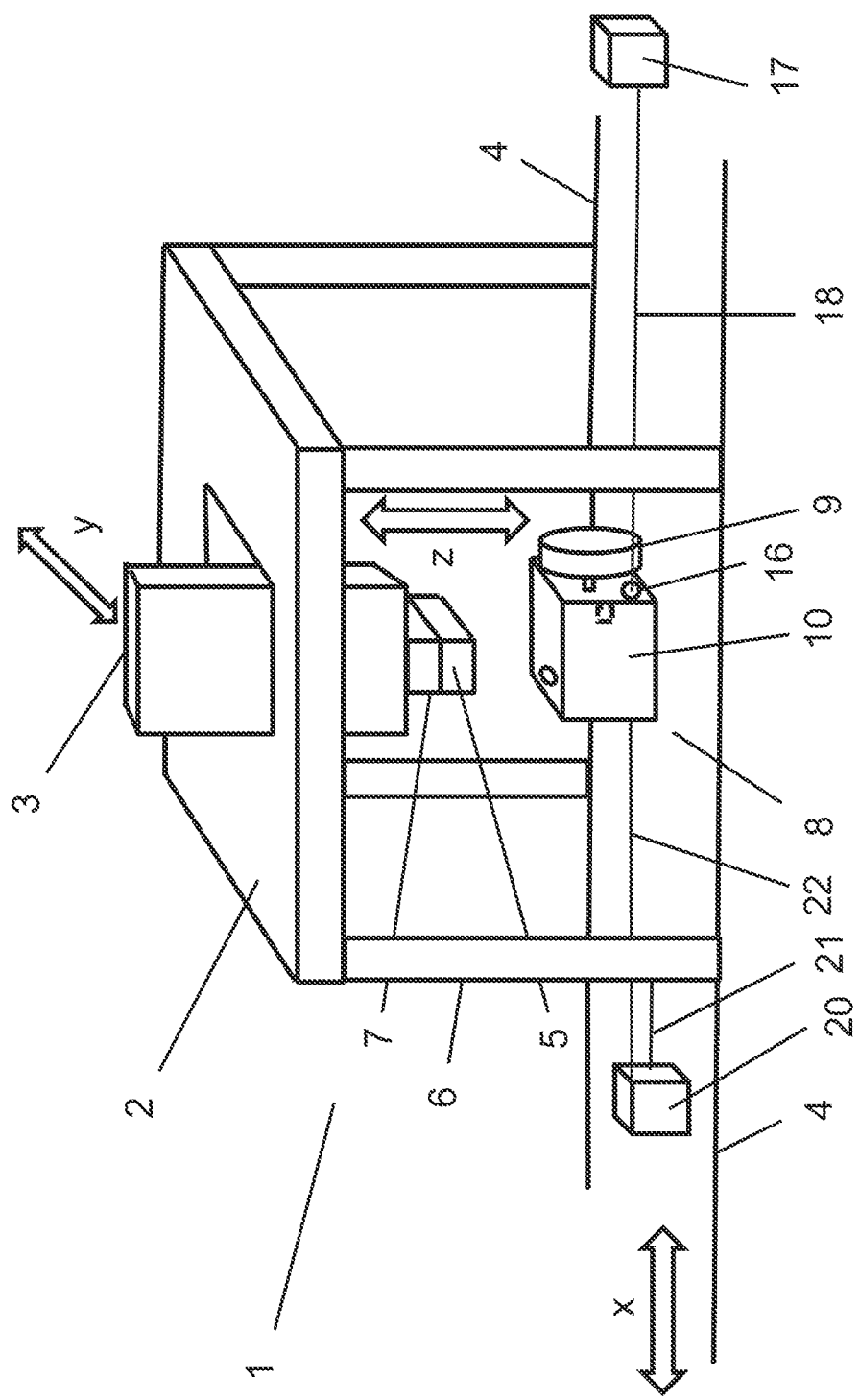
FIG. 2 shows a coordinate measuring machine having a rotary table module with a horizontal alignment of the rotary table axis of the rotary table.

As can be seen in FIG. 2, not only is the rotary table module 8 attachable at different positions in the measurement space of the coordinate measuring machine 1, but the rotary table module 8 can also be supported on different sides of the rotary table block 10, with the result that the rotary table 9 with its rotary table axis is differently aligned or oriented. As shown in FIG. 2, the rotary table module 8 is supported on a side surface such that the rotary table axis is aligned horizontally. A workpiece correspondingly arranged on the rotary table 9 then protrudes laterally from the rotary table 9, with the result that the measurement system 5 has other options for accessing the workpiece to be measured. In addition to tilting the rotary table module 8 by 90°, further tilt angles are also conceivable, for example with values of between 0° and 90°, for example 30°, 45°, or 60°, for which the rotary table block can be correspondingly shaped (see FIG. 5).

Figure 3:
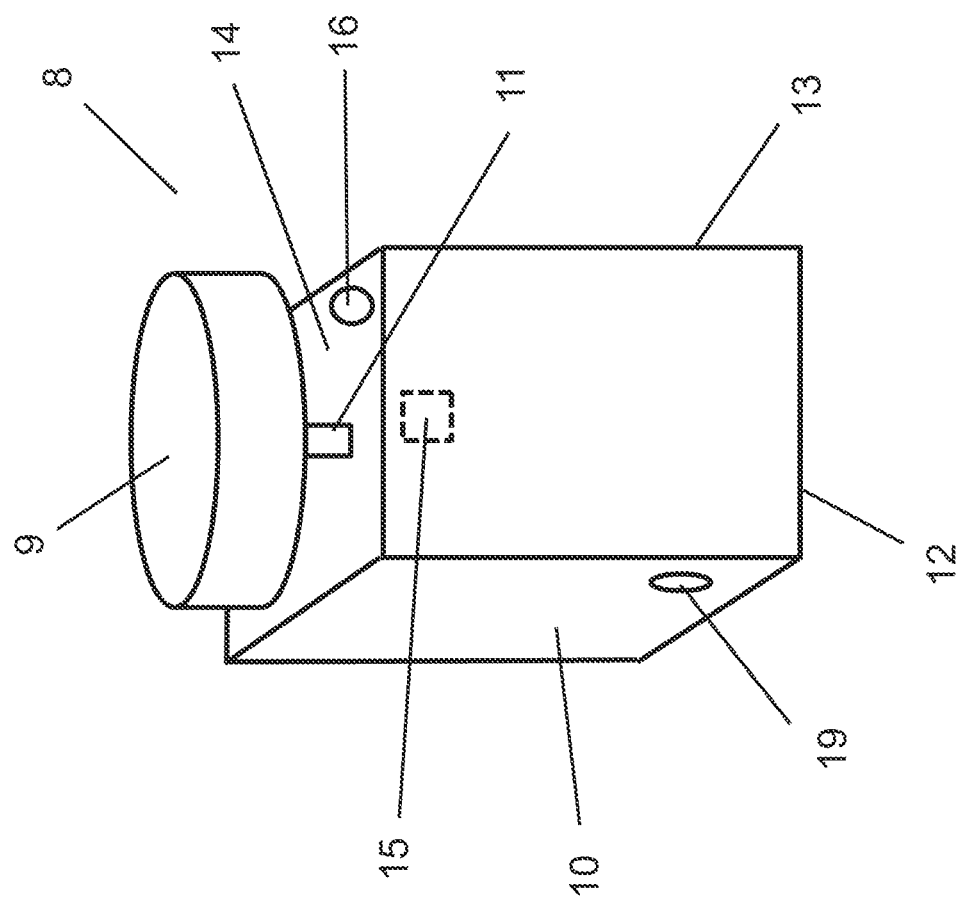
FIG. 3 is an enlarged illustration of the rotary table module shown in FIGS. 1 and 2 with a vertical alignment of the rotary table axis.

FIG. 3 shows in detail the rotary table module 8 with the rotary table 9 and the rotary table block 10 in which the rotary table axis 11 is rotatably supported such that the rotary table 9 can be rotated about the rotary table axis 11. In the illustration in FIG. 3, as in FIG. 1, the rotary table module 8 is supported on a bottom side 12 of the rotary table block 10, which is opposite the rotary table side 14 on which the rotary table 9 is arranged. Accordingly, if the rotary table module 8 is arranged on the bottom side 12, the rotary table axis 11 of the rotary table 9 is arranged in a vertical alignment.

In the exemplary embodiment shown in FIGS. 1 to 4, the rotary table module 8 has three pose capturing devices 15, 16, and 19, with the aid of which the alignment or orientation of the rotary table module 8 can be determined and with which the information about the alignment or orientation in which the rotary table module 8 is arranged in the measurement region of the coordinate measuring machine 1 can be provided to the control device 20 of the coordinate measuring machine 1 (see FIG. 1), which is connected via data and/or signal lines 21, 22 to the components of the coordinate measuring machine 1 and the rotary table module 8, and/or to a rotary table controller (not shown in more detail) of the rotary table module 8.

A first pose capturing device is implemented by an acceleration sensor 15, which is arranged at the rotary table block 10. With the acceleration sensor 15, which can itself include a plurality of sensor elements, the acceleration due to gravity can typically be captured in a plurality of independent spatial directions so that the alignment of the rotary table module 8 can be determined thereby.

Figure 4:
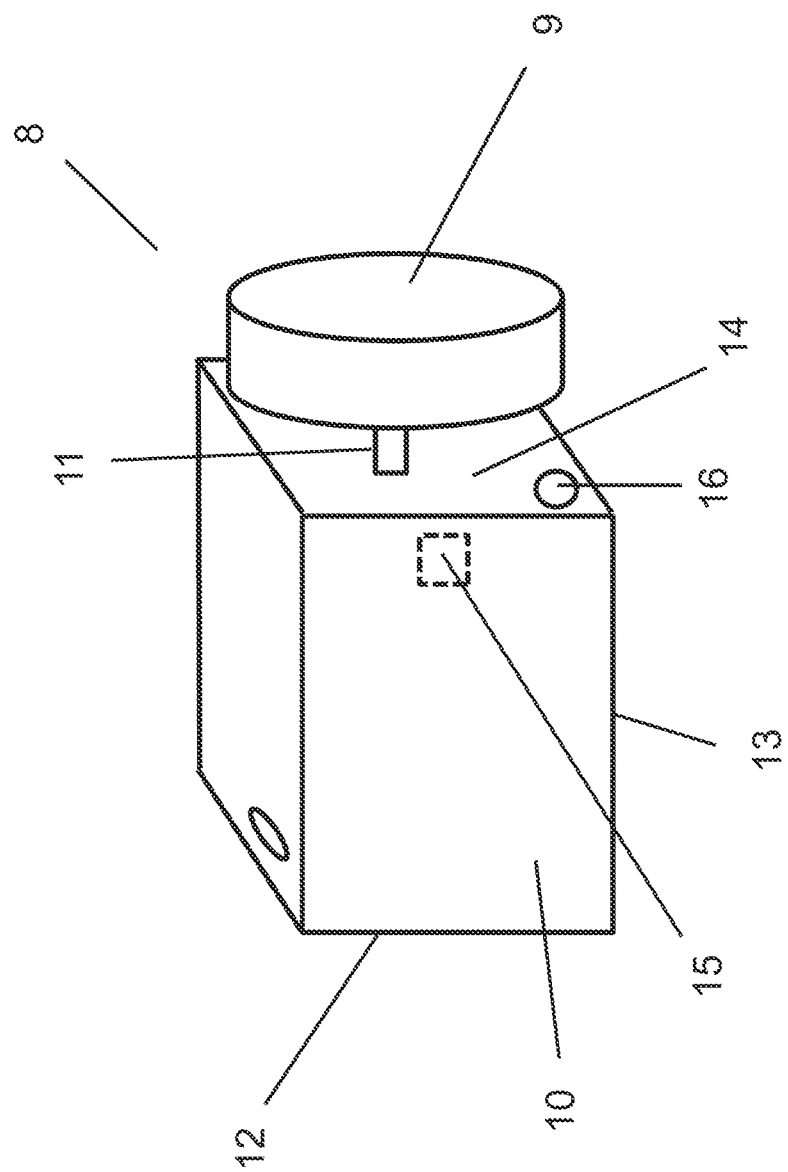
FIG. 4 is an enlarged illustration of the rotary table module shown in FIGS. 1 and 2 with a horizontal alignment of the rotary table axis.

In the exemplary embodiment shown in FIGS. 1 to 4, a further pose capturing device is implemented by a light barrier arrangement, a part of which, to be specific the light source 16, is arranged at the rotary table block of the rotary table module. In addition to the light source 16, the light barrier arrangement also includes a light sensor 17, which in the exemplary embodiment shown is located at the coordinate measuring machine 1 and captures the light from the light source 16 only if the rotary table module 8 is tilted from a vertical orientation into a horizontal orientation, as shown in FIGS. 2 and 4. If the rotary table 9 with its rotary table axis 11 is in a vertical alignment, the light beam which is emitted by the light source 16 cannot be captured by the light sensor 17. Accordingly, the light barrier arrangement can output a signal which indicates to the control device 20 of the coordinate measuring machine 1 that the rotary table module 8 is not in a position in which the rotary table axis 11 of the rotary table 9 is in a horizontal alignment. However, if the rotary table 9 with the rotary table axis 11 is tilted so that the rotary table axis 11 is in a horizontal alignment, the light beam 18 (see FIG. 2) of the light source 16 is captured by the light sensor 17 and the light barrier arrangement can output a signal that indicates to the control device 20 that the rotary table 9 with its rotary table axis 11 is in a horizontal alignment. In order to be able to detect the light beam 18 of the light source 16 not only in a specific position of the rotary table module 8, the light sensor 17 can be dimensioned accordingly and extend over, for example, two sides of the coordinate measuring machine 1.

A further pose capturing device can be implemented by a switch 19, by which the operator can set, for the arrangement of the rotary table module 8, the alignment or orientation of the rotary table module 8. For example, the switch 19 can be a rotary switch that is positioned parallel to the rotary table axis 11 of the rotary table 9 if the rotary table module 8 is vertically aligned (see FIG. 3), whereas the switch 19 can be rotated to a position transverse to the rotary table axis 11 of the rotary table 9 if the rotary table module 8 is supported horizontally.

In addition to the pose capturing devices that are entirely or partially formed in the rotary table module 8, such as the switch 19 and the acceleration sensor 15, further orientation capturing devices can also be embodied as part of an arrangement capturing device of the coordinate measuring machine 1, which are entirely or partially implemented in the coordinate measuring machine 1. The light sensor 17 or the light source 16 of the light barrier arrangement in which the light source 16 is arranged at the rotary table module 8 and the light sensor 17 is arranged at the coordinate measuring machine can be seen as an example of a partial implementation of the orientation capturing device or pose capturing device in the coordinate measuring machine 1 or in the rotary table module 8. Of course, a reverse arrangement of the light sensor 17 at the rotary table module 8 and the light source 16 in the coordinate measuring machine 1 is also possible.

Moreover, it is also possible to implement an orientation capturing device completely exclusively in the coordinate measuring machine 1. This can be, for example, an input option for the operator in the control device 20 of the coordinate measuring machine 1, with which the operator can specify the orientation of the rotary table module 8. This can be provided, for example, in the control software for the coordinate measuring machine 1 or in the measurement software for performing the measuring tasks. For example, the operator can input the angle between the axis of rotation and the measurement table. In the case of a free angle specification, suitable parameters for operating the rotary table can be calculated by the control device (closed-loop, filter or safety parameters). Alternatively, the user can select a predefined mounting position.

For the operation of the coordinate measuring machine 1, this means that, if the rotary table module 8 is arranged in the measurement region of the coordinate measuring machine 1, the orientation or alignment of the rotary table module 8 is determined by at least two pose capturing devices of the rotary table module 8 and/or orientation capturing devices of the coordinate measuring machine 1. In the exemplary embodiment shown, for the arrangement of the rotary table module in a vertical orientation according to FIG. 1, the switch 19 can thus be switched accordingly and the acceleration sensor 15 can detect the vertical alignment of the rotary table module 8. Moreover, the operator can use the control or measurement software to make the information about the orientation of the rotary table module 8 available to the control device 20 or to a rotary table controller in the rotary table module 8. The information of the switch 19 and of the acceleration sensor 15 can likewise be made available to a rotary table controller provided in the rotary table module 8 and/or, via a data and signal line 22, to the control device 20 of the coordinate measuring machine 1 so that the operation of the rotary table 9 may be made possible in an unlimited manner via the control device 20 and/or the rotary table controller in the case of matching information about the vertical alignment of the rotary table module 8. However, it is also possible that other or further pose capturing devices of the rotary table module 8 and/or orientation capturing devices of the coordinate measuring machine 1 or combinations thereof are used, for example the combination of an acceleration sensor with an option to input the information about the orientation of the rotary table module 8 by way of the operator via the control or measurement software and the verification of this information about the calibration of the rotary table axis for the operation of the coordinate measuring machine, i.e., the determination of the orientation of the rotary table module by determining the position and alignment of a rotary table coordinate system associated with the rotary table.

If the rotary table module 8 shown in FIGS. 2 and 4 is arranged with a horizontal alignment of the rotary table axis 11 of the rotary table 9 in the measurement region of the coordinate measuring machine 1, the operator can indicate at the control device 20 of the coordinate measuring machine 1 via an input/output interface of the control device 20 that the rotary table module 8 is arranged in a horizontal orientation. In addition, the operator can move the switch 19 into an appropriate position. In addition, the acceleration sensor 15 and the light barrier arrangement with the light source 16 and the light sensor 17 are used to capture that the rotary table module 8 is arranged in a tilted position. Accordingly, the control device 20 and/or the rotary table controller of the rotary table module 8 can restrict the rotary movement of the rotary table 9 or set it in a specific way, for example with regard to the permissible direction of rotation of the rotary table, the maximum permitted current for driving the motor for the drive apparatus of the rotary table, and the like.

For example, the direction of rotation of the rotary table can be restricted to a single direction of rotation, in which, for example, the rotary table is rotated such that it is rotated, according to the illustration of FIG. 3, out of the image plane at the bottom and into the image plane at the top. If, for example, the front side shown in FIGS. 1 and 2 is the operator's side on which an operator operates the device, then the fact that the direction of rotation of the rotary table 9 is set such that the rotary table moves towards the operator at the bottom can result in there being no risk in the gap between the rotary table 9 and the surface on which the rotary table module 8 is arranged of objects or body parts being pulled in, since the rotary table, on account of its rotary movement, will move objects that pass into this gap from the operator's side into the gap out of said gap so that an operator located in front of the coordinate measuring machine 1 is not pulled in the direction of the rotary table 9 because of the rotary movement of the rotary table 9 if they inadvertently come into contact with the rotary table 9, but rather is pushed back by it.

Alternatively or additionally, it is possible to provide further restrictions, such as, for example, a restriction of the maximum torque of the drive for the rotary movement about the rotary table axis 11 or a restriction of the maximum rotary table speed or rotational speed of the rotary table 9. Moreover, further restrictions on the operation of the rotary table 9 are conceivable if the rotary table 9 with its rotary table axis 11 is outside the vertical orientation and in particular in a horizontal alignment of the rotary table axis 11. Moreover, it is possible to vary further parameters of the controller according to the alignment of the rotary table axis 11.

If the pose capturing device(s) of the rotary table module 8 and/or orientation capturing device(s) of the coordinate measuring machine 1 provide different results, the control device can be set in such a way that only a restricted operation of the rotary table 9 is possible, for example as if it had been clearly determined that the rotary table axis 11 of the rotary table 9 is in a horizontal alignment. Furthermore, in this case, if the control device 20 and/or the rotary table controller of the rotary table module 8 has been provided with differing information about the orientation of the rotary table module 8, it is possible to completely prevent the operation of the rotary table module 8 or to completely block the operation of the rotary table 9, with the result that no rotary operation of the rotary table 9 is possible at all. Only if the information from at least two pose capturing devices and/or orientation capturing devices matches or if the orientation information of all pose capturing devices and/or orientation capturing devices about a specific orientation of the rotary table module 8 matches completely is it possible either for unrestricted operation of the rotary table 9 to be made possible if the rotary table module 8 is arranged in a vertical alignment and this is confirmed by the pose capturing devices and/or orientation capturing devices, or a restricted operation with a restriction of the operating parameters or the pre-setting of specific operating parameters is made possible.

In the exemplary embodiment shown in FIGS. 1 to 4, the rotary table module 8 is embodied such that it can be supported in at least two positions in the measurement region of the coordinate measuring machine 1, specifically on the bottom side 12, which is formed opposite the rotary table 9 at the rotary table block 10 for the one part, and for the other part on a supporting side 13, which is formed transversely to the bottom side as a side surface of the rotary table block 10. However, it is of course possible that the rotary table module 8 is embodied such that a plurality of supporting sides 13 are formed at the rotary table block 10, as is shown for the rotary table module 8a with the rotary table block 10a.

Figure 5:
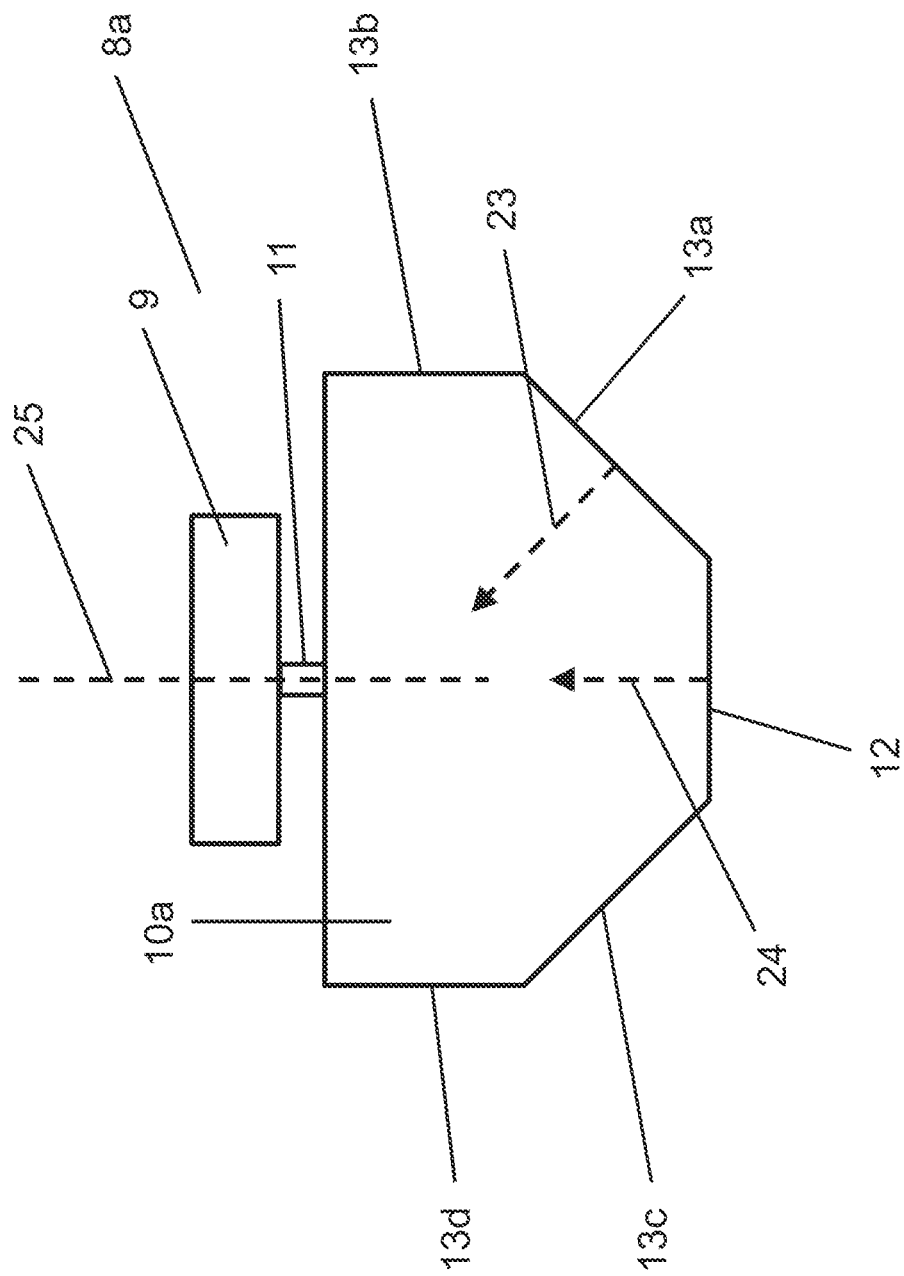
FIG. 5 shows a cross-sectional view of a further exemplary embodiment of a rotary table module.

The rotary table module 8a, which is shown in FIG. 5, has four additional supporting sides 13a to 13d in addition to the bottom side 12, which lies opposite the rotary table side 14 or the rotary table 9, wherein the supporting sides 13b and 13d are embodied as side surfaces perpendicular to the bottom side 12, whereas the supporting sides 13a and 13c are arranged at an angle to the bottom side 12. Accordingly, the rotary table axis 11 or the rotary table axis direction 25 is parallel to the normal 24 of the bottom side 12 and perpendicular to the normal of the supporting sides 13b and 13d, whereas the normal 23 of the supporting sides 13a and 13c intersect the rotary table axis direction 25 at an angle. Accordingly, the rotary table axis 11 is vertically aligned if the rotary table block 10a is supported on the bottom side 12, whereas the rotary table axis 11 is horizontally aligned if the rotary table block 10a is supported on the supporting side 13b or 13d. When the rotary table block 10a is supported on the supporting side 13a or 13c, the rotary table axis 11 is oriented obliquely, for example at an angle of 30°, 45°, or 60° to the horizontal.

Although the present disclosure has been described in detail on the basis of the exemplary embodiments, it is obvious to a person skilled in the art that the disclosure is not restricted to these exemplary embodiments but rather that modifications are possible, such that individual features can be omitted or different types of combinations of features can be implemented, without departing from the scope of protection of the appended claims. In particular, the present disclosure covers all combinations of the individual features shown in the various exemplary embodiments, such that individual features described only in connection with one exemplary embodiment can also be used in other exemplary embodiments or in non-explicitly shown combinations of individual features.

LIST OF REFERENCE NUMERALS

1 Coordinate measuring machine
2 Gantry
3 Carriage
4 Rail
5 Measurement system
6 Column
7 Mount
8 Rotary table module
9 Rotary table
10 Rotary table block
11 Rotary table axis
12 Bottom side
13 Supporting side
14 Rotary table side
15 Acceleration sensor
16 Light source
17 Light sensor
18 Light beam
19 Switch
20 Control device
21 Data and signal line
22 Data and signal line
23 Normal on a supporting side 24 Normal on the bottom side
25 Rotary table axis direction

What is claimed is:

1. A rotary table module for a coordinate measuring machine, the rotary table module comprising:
    a rotary table block having a rotary table side, and a bottom side arranged opposite to the rotary table side with which the rotary table module can be supported in a measurement region and/or on a measurement table of the coordinate measuring machine; and
    a rotary table configured to receive a workpiece, the rotary table defining a rotary table axis, being arranged rotatably about the rotary table axis on the rotary table side, and including at least one pose capturing device configured to determine whether the rotary table block is supported on the bottom side.

2. The rotary table module according to claim 1, wherein the rotary table block has at least one further supporting side with which the rotary table block is supportable in the measurement region and/or on the measurement table of the coordinate measuring machine and which differs in its alignment from the bottom side.

3. The rotary table module according to claim 1, wherein the rotary table axis of the rotary table is arranged transversely or perpendicular to the bottom side, or parallel to a normal of the bottom side, such that the rotary table axis is vertically aligned during operation if the rotary table block is supported on the bottom side.

4. The rotary table module according to claim 2, wherein the rotary table axis of the rotary table is arranged at an angle smaller than 90°, parallel to the supporting side, at the angle larger than 0°, or at the angle of 90° to a normal of the supporting side.

5. The rotary table module according to claim 1, wherein the at least one pose capturing device is configured such that it can be determined on which side of the rotary table block it is supported and thus which alignment the rotary table axis of the rotary table has.

6. The rotary table module according to claim 1, wherein:
    the rotary table module has a drive apparatus for driving the rotary table and a rotary table controller, and
    the rotary table controller is configured to restrict a drive for a rotation of the rotary table when the at least one pose capturing device determines that the rotary table block is not supported on the bottom side completely or by its full area and thus the rotary table axis is tilted out of a vertical alignment.

7. The rotary table module according to claim 6, wherein:
    the rotary table controller is configured such that restricting the drive for a rotary movement of the rotary table is at least one of:
    restricting a direction of rotation of the rotary table,
    restricting a power of the drive apparatus,
    restricting a rotational speed of the rotary table,
    restricting a torque of the drive,
    restricting a speed of rotation of the rotary table,
    restricting an acceleration of rotation,
    restricting an operating current of a motor of the drive apparatus of the rotary table,
    restricting kinetic energy of the rotary table with the workpiece,
    restricting a rotation angle range, and
    stopping the drive.

8. The rotary table module according to claim 1, wherein:
    the rotary table module has a drive apparatus for driving the rotary table and a rotary table controller, and
    the rotary table controller is configured to cause the drive apparatus to rotate the rotary table with specific parameters when it is determined with the at least one pose capturing device that the rotary table block is supported on one of a plurality of supporting sides and thus the rotary table axis has a specific alignment.

9. The rotary table module according to claim 8, wherein:
    the rotary table controller is configured to cause the specific parameters of the drive apparatus for a rotary movement of the rotary table to be selected from:
    a direction of rotation of the rotary table,
    a power of the drive apparatus for driving the rotary table,
    a rotational speed of the rotary table,
    a torque of a drive,
    a speed of rotation of the rotary table,
    an acceleration of rotation,
    a restriction of kinetic energy of the rotary table with the workpiece,
    a restriction of a rotation angle range, and
    an operating current of a motor of the drive of the rotary table.

10. The rotary table module according to claim 1, wherein:
    the at least one pose capturing device includes one or more sensors configured to:
        determine that the rotary table block is not supported on the bottom side, or
        determine on which side of the rotary table block it is supported, and
    the one or more sensors include one of an acceleration sensor, an inclination sensor, an orientation sensor, a capacitive sensor, a brightness sensor, a switch, a magnetic switch, a Reed switch, a mercury switch, a push button, and a light barrier.

11. The rotary table module according to claim 1, wherein the rotary table module has at least two pose capturing devices which operate independently of one another.

12. The coordinate measuring machine comprising:
    at least one measurement device configured to measure the workpiece; and
    the rotary table module configured to receive the workpiece according to claim 1.

13. The coordinate measuring machine according to claim 12, further comprising:
    a control device configured to interact with a rotary table controller of the rotary table module, and/or
    wherein the rotary table controller of the rotary table module is at least partially integrated into the control device.

14. The coordinate measuring machine according to claim 12, further comprising:
    at least one arrangement capturing device configured to capture an arrangement of the rotary table module, and
    wherein the at least one arrangement capturing device includes at least one or at least two orientation capturing device(s) configured to operate independently of one another, each of which detecting an orientation of the rotary table module when the rotary table is arranged in the measurement region of the at least one measurement device.

15. The coordinate measuring machine according to claim 14, wherein at least one orientation capturing device or at least two orientation capturing devices are formed by pose capturing devices of the rotary table module.

16. The coordinate measuring machine according to claim 14, wherein:

an orientation capturing device is implemented by a user input interface and/or a device for determining a rotary table coordinate system, and/or the orientation capturing device includes at least one of a switch, a light sensor, and a light barrier.

17. The coordinate measuring machine according to claim 13, further comprising:

at least one device for determining a rotary table coordinate system associated with the rotary table, and wherein the control device is configured to cause a device for determining the rotary table coordinate system to determine an orientation of the rotary table module.

18. A method for operating a coordinate measuring machine, the coordinate measuring machine including at least one measurement device configured to measure a workpiece, and a rotary table module configured to receive the workpiece, the method comprising:

arranging the rotary table module in a measurement region of the at least one measurement device on a bottom side or a supporting side of a rotary table block of the rotary table module, and determining an orientation of the rotary table module via at least two orientation capturing devices that operate independently of one another.

19. The method according to claim 18, wherein:

the rotary table module has a drive apparatus for driving the rotary table, driving for a rotation of the rotary table is restricted when the rotary table module is arranged in a position in which a rotary table axis of the rotary table is arranged obliquely to the vertical, or in a horizontal alignment, and driving the rotary table to perform a rotary movement about the rotary table axis is permitted only when the rotary table axis is positioned in one or more defined alignments.

20. The method according to claim 18, further comprising:

restricting driving the rotary table to perform a rotary movement of the rotary table, wherein restricting includes at least one of:

restricting a direction of rotation of the rotary table, restricting a power of a drive, restricting a rotational speed of the rotary table, restricting a torque of the drive, restricting a speed of rotation of the rotary table, restricting an acceleration of rotation, restricting an operating current of a motor of the drive of the rotary table, and stopping the drive.

21. The method according to claim 18, wherein:

the rotary table module has a drive apparatus configured to drive the rotary table, and the method further comprises:

driving the rotary table for rotation with specific parameters such that, when the orientation of the rotary table module is determined, it is determined that the rotary table block is supported on a specific one of a plurality of supporting sides and thus a rotary table axis of the rotary table has a specific alignment.

22. The method according to claim 21, wherein the specific parameters for driving the rotary table include a direction of rotation of the rotary table, a power of the drive apparatus, a rotational speed of the rotary table, a torque of the drive, a speed of rotation of the rotary table, an acceleration of rotation, and an operating current of a motor of the drive of the rotary table.

23. The method according to claim 18, wherein:

a determination of the orientation of the rotary table module already determines a tilt of a rotary table axis of the rotary table at an angle to the vertical when this is determined by at least one orientation capturing device, or the determination of the orientation of the rotary table module determines that the rotary table module is supported on a specific supporting side only if this is determined by the at least two orientation capturing devices.

24. The method according to claim 18, wherein the rotary table is not driven to perform a rotary movement about a rotary table axis when orientations of the rotary table module determined by a plurality of orientation capturing devices differ.

25. The method according to claim 18, wherein the orientation of the rotary table module is determined by determining a position and alignment of a rotary table coordinate system associated with the rotary table.

* * * * *